United States Patent Office 3,692,472
Patented Sept. 19, 1972

3,692,472
RECOVERY OF SULFUR DIOXIDE
Warren E. Winsche, Bellport, Edward Wirsing, Jr., Mattituck, and Richard H. Wiswall, Jr., Brookhaven, N.Y., assignors to the United States of America as represented by the United States Atomic Energy Commission
No Drawing. Filed Apr. 28, 1971, Ser. No. 138,370
Int. Cl. C01b 17/60; B01j 11/32
U.S. Cl. 423—244               3 Claims

ABSTRACT OF THE DISCLOSURE

A process for recovering $SO_2$ from a gas in which the gas is passed through a bed of reactive $UO_2$ to absorb the $SO_2$. The saturated bed is reconstituted by passing sulfur vapor diluted by an inert gas through the bed to reduce the latter back to $UO_2$.

SOURCE OF THE INVENTION

The invention described herein was made in the course of, or under a contract with the U.S. Atomic Energy Commission.

BACKGROUND OF THE INVENTION

During the past few years there has been increasing concern over the presence of polluting products being discharged into our environment with special attention being directed to those products which pollute our atmosphere.

One of the polluting products of particular concern is $SO_2$ which is discharged into the atmosphere as part of the effluent from power plants and certain other industrial processes. This gaseous compound is considered to be especially harmful to people with respiratory ailments and those at an advanced age in addition to being uncomfortable. Also $SO_2$ is detrimental to the finishes of home furnishings and other items of esthetic value.

Considerable effort has been expended toward the elimination of $SO_2$ from effluents such as the flue gases of power plants including the increasing use of low sulfur content fuels. Because of the increasing demands for such fuels, costs have gone up significantly, and the problem is not eliminated entirely because it is not always possible to use low sulfur fuels. Further, $SO_2$ is still found in the effluent from some industrial processes.

Studies have been made over a period of years investigating other possible courses of action which may be followed to eliminate $SO_2$ from gases. One area of great interest has to do with the known ability of certain metal oxides to absorb $SO_2$ in the presence of $O_2$. The reaction product is either discarded or reconverted to oxide by treatment with hydrogen or a carbonaceous reducing agent such as CO or $CH_4$. The cost of such reductants contributes an appreciable fraction to the cost of the whole process. One example of such a process is described in U.S. Pat. No. 3,501,897 in which alumina and copper oxide are described as metal oxides useful for this purpose. A principal drawback of such systems which have been used or studied is the cost involved, either as a result of discarding the reaction product from the absorption of the $SO_2$ by the metallic oxide or in the expense of reductants in order to recover the sulfur values.

SUMMARY OF THE PRESENT INVENTION

The present invention makes it possible to recover the sulfur values in a process of $SO_2$ absorption through a new type of cycle in which elemental sulfur is used in the regeneration step. The cost of the sulfur is recovered through the sale of the $SO_2$ product which is produced in the regeneration step.

It is known that most metal compounds are converted to sulfides upon heating with elemental sulfur. An exception is uranyl compounds, as molten sulfur converts uranyl nitrate to $UO_2$. Based upon this characteristic of uranyl compounds, a unique process has been devised which is capable of removing $SO_2$ present in relatively small amounts from a gas at a cost which is substantially less than heretofore was considered to be possible.

In accordance with the principles of this invention gas containing $SO_2$ and excess $O_2$ is passed through a bed of reactive $UO_2$ which absorbs the $SO_2$ present in the process gas. By reactive $UO_2$ is meant $UO_2$ capable of reacting with $SO_2$ and $O_2$ below 500° C. Excess $O_2$ refers to oxygen present in the amount of at least the stoichiometric equivalent of one mole of $O_2$ per mole of $SO_2$. Air may be added to the gas if there is not enough of the $O_2$ present.

Regeneration of the $UO_2$ bed is then accomplished by passing sulfur vapor through the bed to reduce the bed material to $UO_2$. The sulfur supplied to the bed during regeneration is recovered in the form of $SO_2$ which may be used or sold thereby recovering the cost of the reductant, something which has not been attained in prior processes relying on metal oxide absorption of $SO_2$.

It is thus a principal object of this invention to provide a process for the effective and efficient removal of $SO_2$ from a gas.

Other objects and advantages of this invention will hereinafter become obvious from the following description of preferred embodiments of this invention.

DESCRIPTION OF PREFERRED EMBODIMENTS

The reactivity of $UO_2$ as an absorbent for $SO_2$ and $O_2$ is quite sensitive to its method of preparation. Ordinary commercial $UO_2$ has been found to be unreactive but $UO_2$ resulting from treatment of uranyl sulfate with sulfur vapor performs very well. Hence, in accordance with this invention the process involves successive absorption and regeneration processes within the same bed.

Initially, properly reactive $UO_2$ particles are assembled into a stationary bed and the gas containing $SO_2$ is mixed with air if required and passed upwardly through the bed which is maintained at a temperature of at least 300° C. It was found that in a series of absorption and reduction steps, initially a temperature of 550° C. was required for effective absorption but that as the series continued the minimum temperature required gradually became lower and eventually stabilized at about 300° C. This is believed to be due to the increased reactivity of the $UO_2$. The size of the $UO_2$ particles is not critical.

During the absorption step the following reaction appears to describe the reaction:

(1) $UO_2 + SO_2 + O_2 \rightarrow UO_2SO_4$ where the symbol $UO_2SO_4$ denotes only the solid compound of U, O, and S, and not the exact composition which has not yet established.

The absorption step is ended when routine analysis of the gas leaving the bed shows that the presence of $SO_2$ has risen to above some minium acceptable level. The gas flow may then, if desired, be directed to a second, identical bed in which absorption can be continued.

The first bed is then subjected to a regeneration run. In this process step, metered nitrogen or other inert gas is passed over a reservoir of liquid sulfur for the purpose of adding sulfur vapor. The nitrogen gas containing the sulfur vapor is then passed through the first bed maintained at a temperature of at least 500° C. where the following reaction takes place:

(2) $$S + UO_2SO_4 \rightarrow UO_2 + 2SO_2$$

The gas leaving the first bed is then passed through a sulfur condenser where the excess S is removed and then to an $SO_2$ recovery unit. After regeneration, the first bed is then ready again for absorption of $SO_2$. It is readily apparent that the use of several beds would make it possible to treat a polluted gas continuously by switching from bed to bed in a series of absorption-regeneration cycles.

The following examples illustrate this invention:

Example 1

A bed of commercially purchased uranyl sulfate ($UO_2SO_4$) crystals was placed in a vertical Pyrex glass tube of about one inch inside diameter. The bottom opening of the tube was covered by a porous glass frit which supported the bed of uranyl sulfate crystals. The bed was about one/half foot in depth. The tube was placed in an electrically heated furnace and the bed was heated to about 550° C. Nitrogen gas was passed over a molten bath of sulfur at about 345° C. at which temperature the partial pressure of the sulfur vapor in nitrogen at slightly above atmosphere pressure was such as to produce 20% by volume of sulfur vapor in the nitrogen. This gas was passed up through the porous frit and the bed at just sufficient pressure, about one half atmosphere, to flow through the bed. The lower part of the bed turned black, indicating reduction to $UO_2$ and this gradually extended up through the whole length of the bed, over a period of about one half hour. When the bed was completely reduced the pressure drop through the bed decreased sharply. Flow of gas was discontinued when the bed became all black.

The absorption part of the cycle was conducted by first adding to a stream of nitrogen about 5 volume percent of $SO_2$ and 5 volume percent of $O_2$. At sufficient pressure to pass this gas up through the bed the gas was fed through the porous frit. The bed temperature was reduced to about 500° C. The off gas was tested by bubbling in an iodine solution for the presence of $SO_2$. It was found that there was no detectable amount of $SO_2$ present in the off gas until after about an hour when the bed turned back toward its original color and the pressure drop through the bed as measured by pressure gauges rose to a maximum, indicating that the bed had become saturated.

The cycle was repeated for a total of eight times and it was discovered that the minimum temperature for the bed during absorption gradually declined to about 300° C., apparently indicating greater activation of the $UO_2$ after successive cycles. This increased activation is believed to be a surface effect, due to increasing fracturing of the crystals, exposing more surface areas for reaction.

Example 2

The process of Example I was repeated except that during the absorption step instead of using nitrogen and oxygen, $SO_2$ gas was added to air in the amount of about 5% by volume. This produced a gas with excess $O_2$ over the stoichiometric requirements. The $SO_2$ was completely removed as in the first example. As long as there is sufficient oxygen to eliminate all of the $SO_2$, the presence of excess $O_2$ will not detract from the effectiveness of the process.

It is readily apparent that the process described herein has several important advantages. The process operates successfully at close to ambient pressure conditions thereby avoiding high pressure problems. Minimum temperature conditions are relatively modest and do not appear to be critical as to upper limits, although these are limited by possible loss of activity of $UO_2$ at 600° C. and above and limitations built into the apparatus (i.e., materials).

Due to the color changes which take place and the simple analyses indicating when absorption and reduction are completed, monitoring of this process is relatively precise and convenient.

What is claimed is:

1. The method of recovering $SO_2$ from a gas containing oxygen in the amount of at least the stoichiometric equivalent of one mole of oxygen per mole of $SO_2$ comprising the step of passing said gas through a bed of reactive $UO_2$ particles at a temperature of between about 300° C. and 550° C. until said bed is saturated with $SO_2$, said reactive $UO_2$ particles having been formed from uranyl sulfate which has been reduced by sulfur vapor.

2. The method of claim 1 in which a gaseous stream of inert gas containing sulfur vapor is then passed through the saturated bed at a temperature of at least 500° C. for a period of time sufficient to strip all sulfur from said bed as $SO_2$, thereby reducing said bed to $UO_2$.

3. The process of claim 2 in which said bed is cyclically saturated with $SO_2$ and reduced by sulfur vapor.

References Cited

UNITED STATES PATENTS

| | | | |
|---|---|---|---|
| 1,947,776 | 2/1934 | Huff et al. | 23—2 S |
| 3,649,169 | 3/1972 | Nicklin et al. | 23—2 S |

OSCAR R. VERTIZ, Primary Examiner

C. B. RODMAN, Assistant Examiner

U.S. Cl. X.R.

23—2 S, 2 SQ; 252—467